Aug. 24, 1954 A. C. KRUKONIS 2,687,109
STRIPING MACHINE FOR ELECTRIC CONDUCTORS
Filed Jan. 31, 1952 3 Sheets-Sheet 1
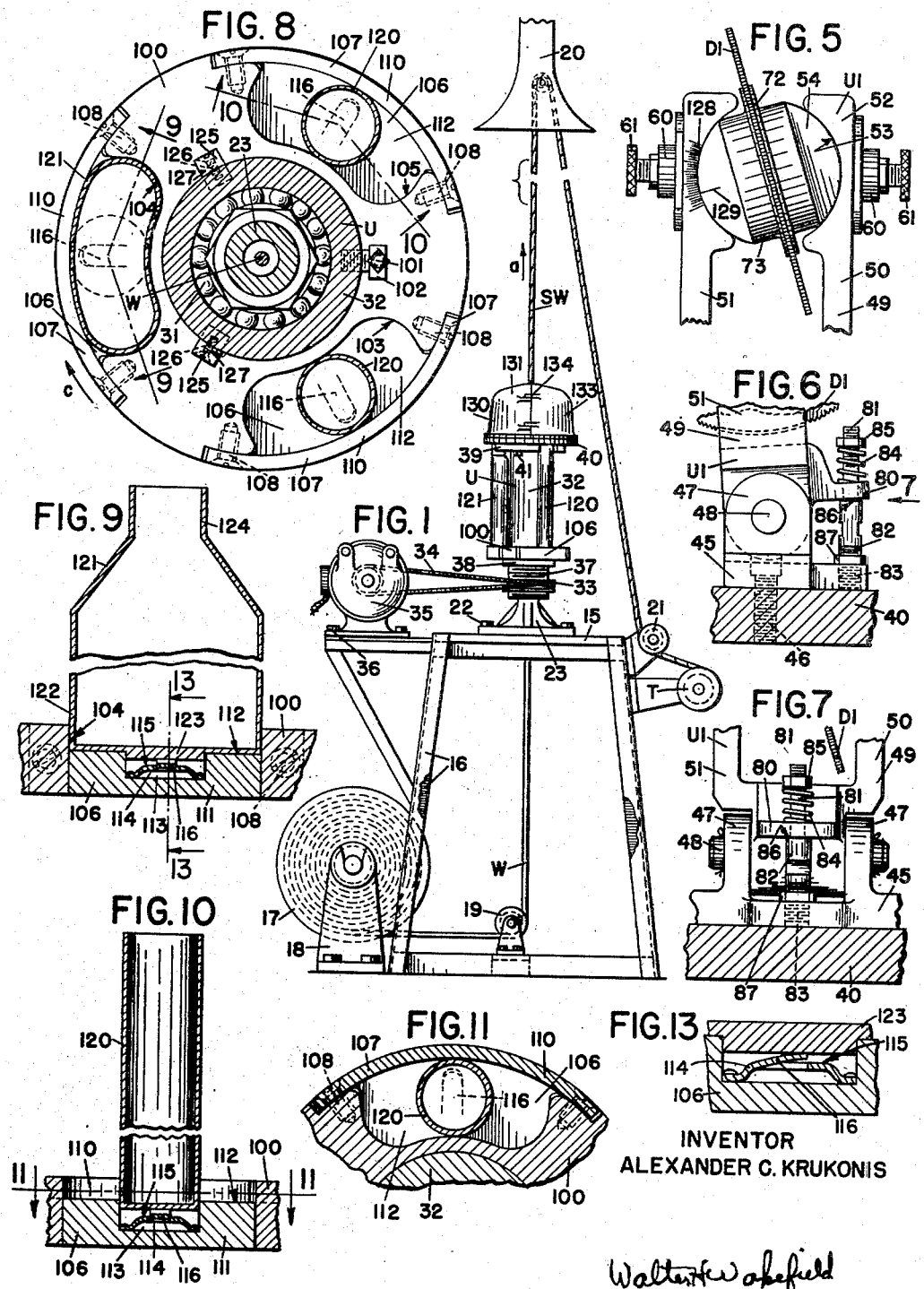
INVENTOR
ALEXANDER C. KRUKONIS
Walter W Wakefield
ATTORNEY

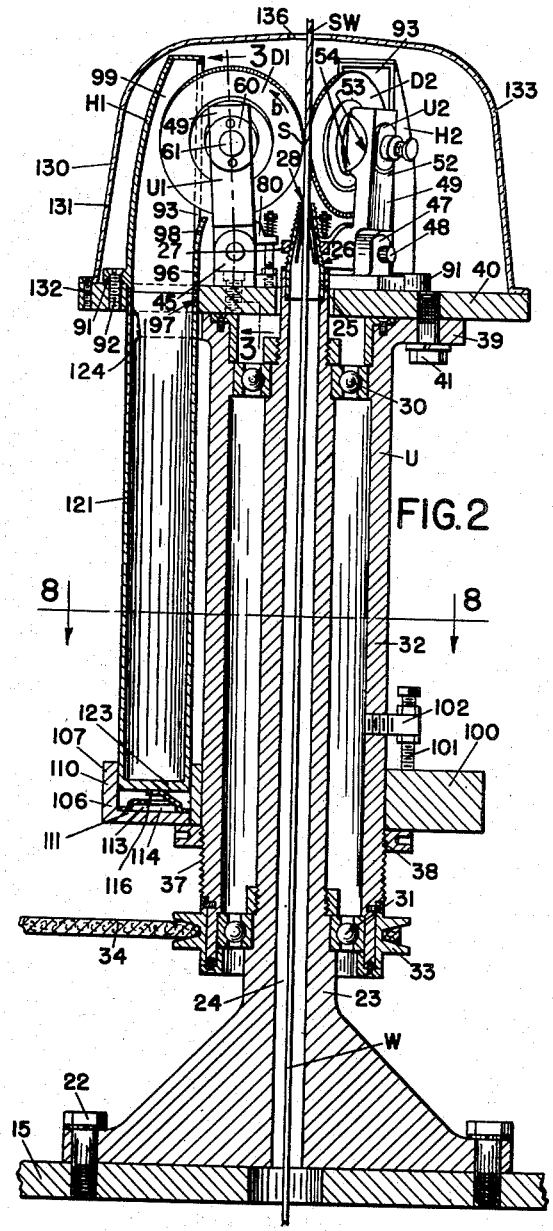
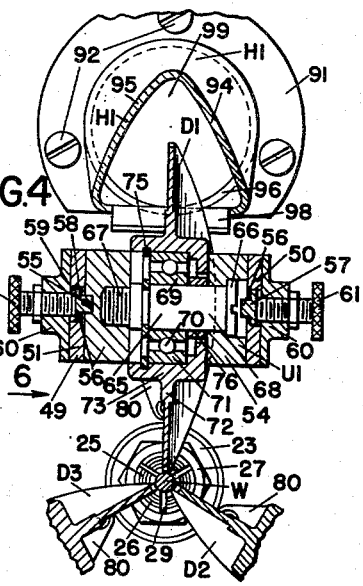
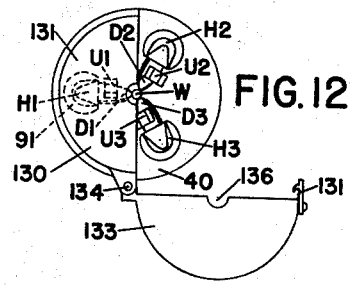
Aug. 24, 1954    A. C. KRUKONIS    2,687,109
STRIPING MACHINE FOR ELECTRIC CONDUCTORS
Filed Jan. 31, 1952    3 Sheets-Sheet 2
INVENTOR
ALEXANDER C. KRUKONIS
ATTORNEY Aug. 24, 1954
A. C. KRUKONIS
2,687,109
STRIPING MACHINE FOR ELECTRIC CONDUCTORS
Filed Jan. 31, 1952
3 Sheets-Sheet 3
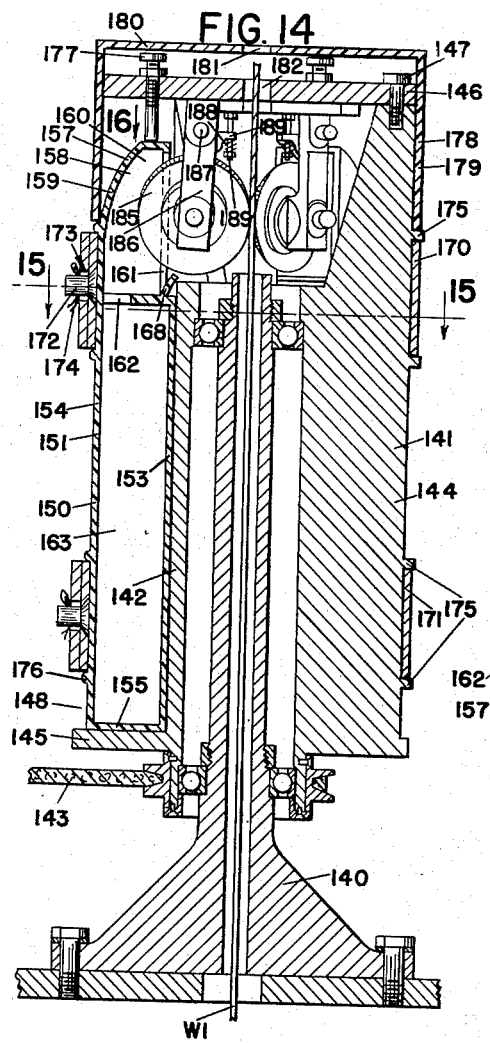
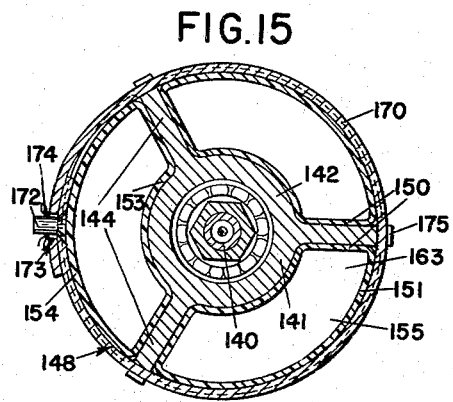
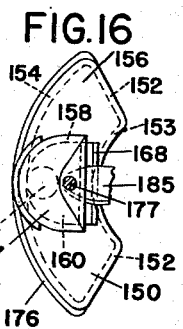
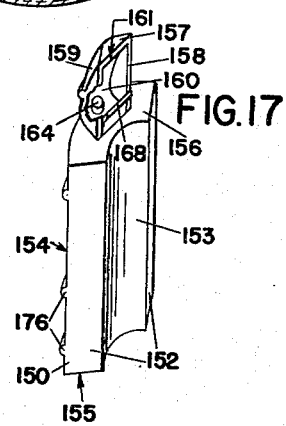
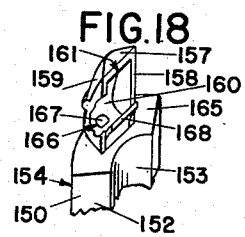
INVENTOR
ALEXANDER C. KRUKONIS
Walter H Wakefield
ATTORNEY Patented Aug. 24, 1954

2,687,109

UNITED STATES PATENT OFFICE 2,687,109

STRIPING MACHINE FOR ELECTRIC CONDUCTORS

Alexander C. Krukonis, Auburn, Mass., assignor to Surprenant Mfg. Co., Boston, Mass.

Application January 31, 1952, Serial No. 269,187

28 Claims. (Cl. 118—221)

This invention is a continuation in part of my co-pending application Serial No. 92,655, filed May 11, 1949, now abandoned.

This invention relates to improvements in striping machines such as are used for distinctively marking the insulation of electric conductors or wires and it is the general object of the invention to provide a machine of this type where the supply of ink for the striping mechanism can be readily replenished.

In striping machines employing revolving disks which are inked from wells in the machine difficulty is experienced in determining when the ink is exhausted and also in placing a new supply of ink in the wells. It is an important object of the present invention to provide removable ink wells which can be taken from the machine when empty and be either refilled or replaced with full wells.

It is another object of the invention to mount the striping disks so they will be located partly at least in open hoods or the like which receive ink from wells below the hoods when the machine is in operation. The hoods extend upwardly from the top plate of the machine and are arranged around the wire or electric conductor being striped and the disks extend from inking pockets in the hoods to the wire. The disks are exposed in full view to enable the operator to adjust them.

Another object of the invention is to provide simple means for adjusting the disks toward and from the axis of rotation of the machine along which the wire moves. This adjustment may be effected by a spring loaded disk carrier held against an adjustable stop screw which locates the disks for striping wires of different diameters.

A still further object of the invention is to construct the aforesaid hoods so they can be readily cleaned when their corresponding wells are removed. The hoods are open on their inner sides to receive the disks and a cleaning fluid can be poured into the openings and on the disks. The greater part of the disks are in the open where the amount of ink on them can be determined visually, thereby indicating to the operator when more ink is needed.

Still another feature of the invention is the angular adjustment of the disks with respect to their pivoted carriers. The angle of the plane of the disk can be changed with respect to the axis of the machine in order to adapt the disks for striping wires having helical stripes of different lay.

It is another object of the invention to adapt the machine to receive either large or small ink wells, depending upon whether broad or narrow stripes are being produced on the wire.

The striping mechanism is inclosed in a cover to reduce evaporation of the solvent of the ink, the cover being so located that it is not disturbed when a depleted ink well is being replaced by a full well.

It is a still further object of the invention to provide a striping machine wherein the ink holding pocket or hood which is entered by the striping disk is combined or integral with a replaceable well so that both the well and hood can be replaced by another combined well and hood without requiring cleaning of the previously used hood if there is to be a change in the color of striping ink.

It is a still further object of the invention to provide a combined ink well and striping disk receiving hood wherein the well is sealed from the hood so that ink can be stored in the well and the seal broken when the well is to be applied to the striping machine. In this feature of the invention the seal will be broken at such a point that ink can flow by centrifugal force upwardly from the well through the break in the seal into the hood.

In order that the invention may be clearly understood reference is made to the accompanying drawings which illustrate by way of example three embodiments of the invention and in which:

Fig. 1 is a front elevation of a striping machine made according to the preferred form of the present invention, Fig. 2 is an enlarged vertical section through the striping unit, Fig. 3 is an enlarged vertical section on line 3—3, Fig. 2, Fig. 4 is a horizontal section on line 4—4, Fig. 3, parts being broken away, Fig. 5 is an elevation of the upper part of the structure shown in Fig. 3, parts being broken away, Fig. 6 is a detail elevation looking in the direction of arrow 6, Fig. 4, the supporting plate or base being in section, and parts being omitted, Fig. 7 is a side elevation in the direction of arrow 7—7, Fig. 6, Fig. 8 is a horizontal section on line 8—8, Fig. 2, Fig. 9 is a fragmentary section on line 9—9, Fig. 8, Fig. 10 is a vertical section on line 10—10, Fig. 8, Fig. 11 is a detail horizontal section on line 11—11, Fig. 10, Fig. 12 is a diagrammatic plan view of the machine shown in Fig. 1 showing the cover in open position to afford access to the striping disks, Fig. 13 is a detail vertical section on line 13—13, Fig. 8, showing the tongue on the rest for the ink well, Fig. 14 is a view similar to Fig. 2 showing the first modified form of the invention wherein the well and striping disk receiving hood are made in one piece and a breakable seal between the well and the hood is in the form of a removable cork, Fig. 15 is a horizontal section on line 15—15, Fig. 14, Fig. 16 is a detailed plan view in the direction of arrow 16, Fig. 14, showing the top of one of the wells with the associated disk, Fig. 17 is a perspective view of one of the combined wells and hoods shown in Fig. 14 with the seal in place to prevent flow of ink from the well into the hood, and Fig. 18 is a view similar to the upper part of Fig. 17, but showing the second modified form of the invention wherein the seal is a breakable top for the well.

Referring particularly to Figs. 1 and 2, a table 15 is supported on legs 16 forming part of the framework of the machine. The reel 17 of insulated electric conductor or wire W to be striped is supported for rotation on a stand 18. A pulley 19 rotatably mounted on the machine guides the wire W which passes upwardly through and along the axis of a striping unit U. The wire after being striped, as at SW, passes upwardly through a drying chamber 20 and then down under another pulley 21 and thence to a drum and wind-up roll T. The wire is drawn through the machine by drum T serving as a feed means in the direction of arrow a, Fig. 1, at a rate which can be varied to change the lay of the stripe produced on the wire.

Secured to table 15 at 22 is an upright bearing member 23 having a bore 24 through which wire W moves upwardly. A hollow conical guide 25 for the wire having an axis which coincides with the axis of unit U is fastened to the upper end of the bearing member and is threaded externally at 26 to receive a reducing nut 27 which, by being turned on the threads 26, can vary the size of the opening 28 in the top of the guide to accommodate wires of different diameters. The guide is slotted at 29 and tends to spread opening 28 when the nut is run up along threads 26. The guide 25 acts to keep the wire on the axis of unit U near the striping station S.

Bearing member 23 is provided with upper and lower ball bearings 30 and 31, respectively, on which rotates a hollow shaft 32 the lower end of which has secured thereto a pulley 33 driven by a belt 34 which in turn is operated by a driving means such as a motor 35, see Fig. 1, mounted on the frame of the machine as at 36. Above pulley 33 shaft 32 is provided with external screw threads 37 on which is threaded a nut 38 the purpose of which will appear hereinafter. The upper part of shaft 32 is formed with an integral horizontal flange 39 to which a flat plate or base 40 is secured as at 41. The shaft 32 and plate 40 constitute a head rotatable about the axis of unit U.

The machine set forth herein is adapted for placing three helical stripes on the wire passing through it. The stripes are produced by three disk units U1, U2 and U3 having striping rollers or disks D1, D2 and D3, respectively, and are alike and equally spaced around the machine axis and wire. Disk unit U1 will be described in detail, with the understanding that this description will suffice for the other units U2 and U3.

Unit U1 has a foot 45 securely fastened to the plate 40 by screws 46. Spaced bearings 47 extend upwardly from foot 45 and support a pivot pin 48, see Figs. 3 and 7. Pivoted on pin 48 is a disk carrier or yoke 49 having right and left arms 50 and 51, respectively, each having a jaw 52 formed with a concave parti-cylindrical surface 53. The latter surfaces are concentric and support between them a disk holder 54 of cylindrical form to fit surfaces 53. The holder is provided with grooves 55 which receive the tongues 56 of key members 57 and 58 on opposite sides of the holder and slidable horizontally in arms 50 and 51, respectively, which have slots 59 to receive the key members.

Extending across each slot 59 is a clamp plate 60 having a clamping screw 61 threaded therein and bearing against the adjacent key member. The screws 61 force the key member against the holder and secure the latter in angularly adjusted position on the yoke. By loosening screws 61 the angular setting of the holder can be varied.

Passing radially through the holder is a stud 65 having a head 66 engaging the right hand part of the holder, see Fig. 3, and having a reduced screw threaded end 67 tapped into the left hand part of the holder. The stud has a barrel 68 on which is mounted the inner race 69 of a ball bearing 70 the outer race 71 of which supports a disk member 72. The latter has a hollow hub 73 from which extends the striping disk D1. Retaining rings 75 engage the left side of the ball bearing, see Fig. 3. The hollow hub and a ring 76 engage the right side of the ball bearing and with the retainer rings hold the bearing in place. The disk is free to rotate on the holder, and the plane of its striping periphery can be adjusted relatively to the axis of the machine by varying the angular setting of the holder.

The yoke 49 has a horizontal arm 80 through which extends the reduced upper end 81 of a vertical stud 82 tapped as at 83 into the foot 45. A compression spring 84 confined between an adjusting nut 85 on the stud 82 and arm 80 pushes the latter down against a shoulder 86 on the stud. The effect of the spring is to hold the disk toward the machine axis, but permit it to move away from the axis if required to do so, as by a thick place in the wire. Stud 82 can be turned in the foot 45 to move the disk away from or toward the machine axis to accommodate large or small wires or conductors, see Fig. 2. Lock nuts 87 hold the vertical adjustment of stud 82.

Each disk has an ink supply system including a part fixed to the plate 40 and a part removable from the machine but normally fastened to it to supply ink to the other part. The part fixed permanently to plate 40 is in the nature of a hood having an inking pocket or chamber, while the removable part takes the form of an ink well which can be replaced when empty. The hoods are shown at H1, H2 and H3, and since they are alike, only one of them will be described in detail.

Hollow hood H1, see Figs. 2 and 4, has a bottom flange 91 secured as at 92 to plate 40 in such position that an opening 93 extending vertically along the part of the hood facing the machine axis will receive the associated striping disk D1. As shown in Fig. 4 the hood has side walls 94 and 95 leading in an outward direction from the opening or mouth 93 relative to the center of the machine. These walls merge at their lower ends into a hollow cylindrical neck 96 which fits closely into and overhangs a bore or socket 97 in plate 40, see Fig. 2. The upper part of the cylindrical neck is formed with an inwardly and upwardly curving lip 98 which ends close to the disk to catch any ink which might drop from the latter as it turns in the direction of arrow b, Fig. 2. The disk projects through opening 93 and into the hood far enough to be inked by ink in an inking pocket 99 formed in the upper part of the hood.

In order to provide the other part of the inking system hollow shaft 32 is surrounded by a well support 100 which rests on the previously described nut 38 and is held by the latter against stop or positioning crew 101 secured in vertically adjusted position on lug 102 on the shaft, see Fig. 2. The support 100 has three recesses 103, 104 and 105 of the shape shown in Fig. 8. Each recess has fitted thereto a well seat 106 having end flanges 107 secured as at 108 to the support 100, see Fig. 8. Each seat has a front or outer wall 110 the top of which may be level with the top of support 100, as shown in Fig. 10. Integral with the wall is a foot plate 111 formed complementarily to and fitting into one of the recesses and having a top surface 112 below the top of the support, see Figs. 9 and 10. Each foot plate has a hole or socket 113 therein opening upwardly and containing a rest 114 the upper surface 115 of which is below surface 112 and is formed with a resilient tongue 116 projecting above surface 115.

The ink wells are of two sizes, well 120 shown in Fig. 10 being the smaller size and fitting at the lower end thereof into hole 113 and resting on a tongue 116. The larger well 121 has a base 122 which fits the associated recess 103—105 and has a downwardly projecting guide 123 which fits hole 113 and rests on tongue 116. The well 121 has a cross-section substantially the same as that of the recesses and is constricted at its upper end. The upper end of each type of well is formed with a neck 124 which fits closely into the bores 97 in plate 40 and abuts the necks at the lower ends of the hoods. Each hood can therefore communicate with a well which may be of either the large or small size. The larger wells are associated with striping disks having broad rims to produce a wide helical stripe on the wire, while the smaller wells are for narrow rimmed disks. The wells are all of substantially the same height and will be held in the bores 97 by their seats 106. The tongues 116 due to their resilience permit slight variations in well length and act to hold the upper end of each well closely against the bottom of its hood. The stop screw 101 limits upward motion of support 100, but permits the tongues to be under some compression when nut 38 is tightened. Vertical keys 125 secured at 126 to the hollow shaft 32 fit key slots 127 in support 100 and permit the latter to move vertically along the shaft but require it to turn with the shaft.

Assuming that wire W is to have produced thereon a broad red stripe and narrow blue and green stripes, disk D1 will have a broad rim and disks D2 and D3 narrow rims. Nut 38 will be run down on screw threads 37 and a large well 121 containing red ink or striping fluid set down on its seat under hood H1, fitting into its recess and resting on tongue 116, see Fig. 13, and held approximately in alignment with the bore 97 thereover by wall 110 and the vertical sides of the associated recess. The depending guide 123 will fit into hole 113 which further helps to hold the well upright. Similarly, two wells 120 containing blue and green ink, respectively, will be fitted into each of the holes 113 of the other two seats and rest on the tongues 116 under them. All three wells will be held in upright position by support 100, but not with their necks 124 necessarily accurately aligned with their bores 97.

Nut 38 is then run up on thread 37 until the tops of the wells strike the under side of plate 40, after which a slight further turning of the nut will bend the tongues 116 downwardly, thereby causing them to exert upward forces on their wells. The operator then adjusts the neck 124 of each well until it registers with the corresponding bore 97, the tongues forcing the wells upwardly into the bores. The nut 38 is then further tightened until the tops of all the wells fit closely against the necks at the lower ends of their hoods. Stop screw 101 is set to prevent nut 38 from exerting too great an upward force on the wells. Nut 38 acts as a positioning and holding means determining the position of the support 100 and the wells, holding the latter in normal position when run up on thread 37 and when run down on the screw permitting the support to move down to well releasing position.

Wire W having been threaded up through bore 24 and guide 25 will be carried up to the heating chamber 20 and then brought down around sheave 21 and connected to the wind-up mechanism (not shown). When wire W is drawn taut it will lie along the axis of the striping unit U.

The disks will then have their angles adjusted by means of the scale 128 and graduation 129, see Fig. 5, and stops 82 adjusted until the disks just touch the wire with their striping peripheries in firm enough contact with the wire so the latter when moving upwardly will turn the disks. If the size of wire to be striped is larger than the wire previously striped it is preferable to move the disks away from the axis by manipulation of stops 82 before the wire is placed in the machine. The adjusting nut 27 should also be adjusted to cause guide 25 to fit the particular wire being striped.

The machine is then started in rotation, the wire passing upwardly as the hollow shaft 32 is turned to revolve the disks around the wire in the direction of arrow c, Fig. 8, the disks remaining in contact with the wire as they revolve. Due to centrifugal force the inks in the wells will rise into their respective hoods and enter the pockets 99. This effects inking of the disks which then produce helical stripes on the wire according to the width of their rims and the color of ink in the corresponding wells.

Continued running of the machine will use up the ink in the wells, and when the latter near depletion of their ink supplies the machine will be temporarily stopped, any ink remaining in the hoods returning by gravity to their wells as the machine slows down. The nut 38 is then run down on thread 37, and the wells removed by a procedure the reverse of that described for preparing the machine for operation. The wells can then be refilled and returned to the machine, or replaced by full wells held in reserve. The machine is then restarted, and this renewal of ink repeated as often as necessary to complete a particular striping operation.

If it should be required to replace reel 17 with a new reel of the same size wire, the old wire can be spliced to the new wire below table 15, and the joint taped. Should the splice be not materially larger than the wire the new wire can be pulled up through the machine and the stripping operation resumed. If the joint should be larger than the wire, nut 27, which is accessible between the disks, will be backed off, and as the joint reaches the disks they will yield due to springs 84. Guide 25 can then be restored to its original setting and striping resumed.

When it is desired to change the color of ink in a well, the latter is removed and a cleaning fluid directed into the associated hood and on the disk. The cleaning operation is facilitated by the fact that the hook is open to the space above plate 40, and the further fact that the disks are exposed and not confined within the machine. The removed well can either be cleaned, or held in reserve until its color is needed again and a fresh well with the differently colored ink substituted.

The ink used in the striping machine is made with a solvent which is volatile enough to effect quick drying of the striped wire before it is wrapped on the wind-up drum. Because of evaporation of the solvent the ink on the disks and in the hoods thickens if exposed directly to the surrounding air, and to prevent such thickening the disks and hood can be inclosed in a preferably transparent cover 130 secured to plate 40. To afford access to the disks one part 131 of the cover is fastened to plate 40 at 132 and another part 133 is hinged to the first part at 134. The cover is normally held closed by a latch 135 which can be loosened so that part 133 can be swung open as shown in Fig. 12 to permit adjustments of the disks. When closed the cover effectively checks evaporation of the solvent of the ink. The top of the cover has a small hole 136 for passage of the striped wire.

In the form of the invention shown in Fig. 2 the striping disks and ink pocket forming heads are attached to the upper part of a plate and the hoods are separate from the ink wells. In the modified forms of the invention shown in Figs. 14 to 18 the hoods are secured to the replaceable wells and in order to permit removal of the hoods with their wells the plate which carries the striping disks is above the latter and the hoods.

Referring to Figs. 14-17, a stationary hollow support or bearing member 140, similar to bearing member 23, through which conductor W1 is drawn upwardly, has rotatably mounted thereon a skeleton striping unit or member 141 comprising an upright tubular shaft 142 rotated during operation of the machine by driving means represented by belt 143 about a vertical axis along which conductor W1 moves. Radiating from shaft 142 are flat vertical vanes 144 shown here as being three in number equally spaced angularly around the vertical axis, but the invention is not limited to three vanes nor their equal angular spacing.

The lower ends of the vanes join a bottom plate 145 which is preferably flat and at right angles to the axis of shaft 142. The upper ends of the vanes have a top preferably circular plate 146 secured to them by screws 147, see Fig. 14. The shaft 142, vanes 144 and plate 146 constitute a head similar to that found by shaft 32 and plate 40. The vanes and the bottom plate define ink well receiving compartments 148, see Fig. 15, each located between two vanes and above the corresponding part of bottom plate 145.

Fitted into each compartment 148 is a combined ink well and ink pocket forming hood unit or member 150. When the vanes are equally spaced as shown in Fig. 15 the well and hood members 150 are the same, but if the vanes are unequally spaced angularly the members 150 will be made to fit their corresponding compartments. In any event, the members 150 will be similar and only one of them will be described in detail.

Each unit 150 includes an ink well 151 made of thin material, such as sheet metal or a plastic such as polyethylene, and has flat opposite vertical walls or sides 152 to fit against and extend vertically along two of the vanes 144. Walls 152 are joined by inner and outer parti-cylindrical walls 153 and 154, respectively, and the several walls are connected at their lower ends by a bottom 155 and at their upper ends by a top 156.

Secured to the top 156 of each unit 150 and extending upwardly therefrom is a hood 157 formed with side walls 158 and a back 159 the upper part of which is curved toward the machine axis. The back and walls 158 inclose an ink pocket 160 which has an opening 161 facing toward the axis of the machines. In the modification of the invention shown in Fig. 14 the top 156 has a hole or outlet 162 formed therein located between the hood walls 158 and affording communication between the ink chamber 163 of the well and the pocket 160. The hole 162 is preferably located close to the outer curved wall 154 and the latter and the lower part of back 159 are vertically aligned at least at the hole so that ink may flow upwardly from ink chamber 163 through hole 162 into pocket 160 due to centrifugal force when the unit 141 is rotating. When the well and hood member is in storage awaiting use the top 156 may be sealed by a cork 164 firmly seated in hole 162, see Fig. 17, but removable through opening 161 before application of member 150 to the machine. In the modification shown in Fig. 18 the top 165 may be made without the hole 162 but will be scored as at 166 to provide a weakened area 167 which can be removed or pushed down into the ink chamber below to provide an opening between the well and pocket 160. A lip 168 at the bottom of opening 161 extends upwardly from top 156 and is similar to lip 98.

The several combined well and hood members or units 150 are held in their respective compartments 148 by quickly detachable lock means shown herein as upper and lower straps or clasps 170 and 171, respectively. Each strap may be made of a length of spring sheet metal such as steel having a stud 172 secured at one end thereof to fit into a hole 173 in the other end thereof. A cotter pin 174 is inserted through the stud outside of the perforated end of the strap, see Fig. 15, after the units 150 are in place and are surrounded by the straps.

Each strap is located between a pair of vertically spaced bosses 175 on the vanes 144 and lies between circumferential ribs 176 on the outer curved parts of the units 150. The bosses 175 and ribs 176 and the straps cooperate as lock means to hold the units 150 firmly in place on the rotatable skeleton unit 141 with their bottoms seated on plate 145. If desired, vertically adjusted screws 177 in top plate 146 may be used to engage the tops of hoods 157 to hold units 150 down on plate 145, but these screws can be omitted.

Below the top plate 146 there is more or less open space which during rotation of unit 141 might result in evaporation of the solvent used in the ink. In order to reduce this evaporation to a minimum there is provided a cover 178, preferably transparent, having a cylindrical part or apron 179 resting on the topmost bosses 175. A top 180 for the cover may extend across the apron and when used as a part of the cover 178 it will have a hole 181 aligned with hole 182 in top plate 146 for passage of the conductor W1 being striped.

When one or more of the well and hood units is to be removed the straps will be released by removal of their cotter pins and then removed, and the cover, if used, will then be slid upwardly on the vanes 144. The units 150 will be supported on the bottom support or plate 145 and one by one can be moved horizontally out of their compartments 148. Fresh full well and hood units 150 can then be put in place and the straps fastened to hold the new units 150 in place on the rotatable unit 141.

The striping disks or rollers 185 which are part of the unit 141 are mounted in a manner similar to that shown in Fig. 2 except that the disks are suspended from the under side of the top plate 146. Striping rollers 185, one for each compartment 148, are rotatable on roller carriers 186 which are pivoted about pivots 187 on the under side of plate 146. Each carrier 186 is acted upon by a compression spring 188 engaging an arm 189, similar to arm 80, on the carrier 186 tending to move the carrier and its striping roller toward the conductor being striped but yieldable to permit the rollers to move away from the machine axis when engaging an enlarged part of the conductor W1. Each spring 188 surrounds the lower end of a stud 189 depending from plate 146 and is similar in purpose to stud 82. It is not thought necessary to give a further detailed description of the carriers 186 and parts associated with them, since these carriers are like the carriers 49 already fully described, except that they hang down from the under side of plate 146 instead of extending upwardly as do the carriers 49.

When the combined well and hood units are placed on the machine the striping disks or rollers 185 extend through the openings 161 of their corresponding hoods 157 into the associated pockets 160. Rotation of the striping unit by its driving means will cause ink in each well and hood unit 150 to rise from the well and pass through hole 162 into the corresponding pocket 160 to ink the rollers as they are rotated due to engagement with the moving conductor being striped. The striping operation is the same as that described for the preferred form of the invention and further description of it is not thought to be necessary.

From the foregoing it will be seen that the invention provides a striping machine having ink supplies or wells which are quickly replaceable without requiring removal of the striping rollers from the machine. The rollers are mounted so they can yield away from the machine axis if a thick place in the conductor being striped passes between them. The hoods H1 and H2 extend above plate 40 and are readily accessible for cleaning when the cover is open, and the cover 178 can be slid upwardly to expose rollers 185 for cleaning. In all forms of the invention the wells can be removed before a liquid cleaning agent is applied to the disks so that there will be no danger of contamination or dilution of ink in the wells by cleaning liquid dripping from the rollers. The support 100 is so made that it can hold large or small wells, depending upon whether the corresponding disks have broad or narrow rims. The support 100 and nut 38 may be considered support or lock means cooperating with the unit to hold the well detachably on the unit, and similarly the straps, bosses on the vanes and ribs on the combined well and hood units may be considered releasable lock means to hold said combined units on the striping unit. The resilient seats for the wells facilitate their attachment to or removal from the machine by enabling the operator when running nut 38 up on threads 37 to fit the necks of the wells to the bores 97, and when running the nut down to keep the upper ends of the necks in the bores a slight amount so that by downward pressure they can be released. The axis of the holder for each roller passes through the axis along which the conductor being striped moves for all adjustments of the carrier for different sizes of conductors, and the disks rotate on the holder about an axis which intersects the axis of the holder. A modification of the invention sets forth a combined well and hood unit which can be removed so that a different combined unit with a differently colored ink if desired may be applied to the machine without need for cleaning the hood, and a breakable seal between the ink chamber of the well and the inking pocket of the hood permits the storing of ink in the combined units.

A striping machine wherein ink is caused to rise from a well into an inking pocket to ink a striping disk by centrifugal force is not claimed broadly herein, but is set forth in Patent No. 2,537,884, issued January 9, 1951. The mounting of the striping disks for angular adjustment and movement toward and from the machine axis is not claimed broadly herein, being shown in copending applications Serial No. 82,732, filed March 22, 1949 and Serial No. 90,392, filed April 29, 1949.

Having now particularly described and ascertained the nature of the invention and in what manner the same is to be performed, what is claimed is:

1. In a striping machine, mechanism vertically moving a wire to be striped through the machine, a striping unit having means providing an inking pocket radiating from the wire, driving means rotating the unit around the wire, a striping disk rotatably mounted on the unit extending into the pocket and revolved about the wire and turned by the latter due to vertical movement of the wire, a replaceable ink well formed separately from the unit located below said pocket and having an open upper end, and support means on the unit cooperating with the latter to hold the well fixed to the unit with said open end in communication with the pocket, the driving means when rotating the unit and the well fixed thereto causing ink in the well to rise into the pocket due to centrifugal force to be taken up by the disk to stripe the wire as the disk is rotated by the moving wire.

2. In a striping machine, means vertically moving a wire to be striped through the machine, a unit rotatable about the wire having an inking pocket therein spaced from the wire, roller striping means mounted for rotation on the unit in said pocket and peripherally engaging the wire and rotated thereby as the wire moves vertically, said roller means being revolved about the wire by the unit as the latter rotates, a replaceable ink well separate from the unit located below the pocket, support means capable of assuming holding and releasing positions on the unit with respect to the well and when in holding position cooperating with the unit to cause the well to rotate with the unit and be in communication with said pocket, and driving means to rotate the unit effective when the support is in holding position to cause ink in the well to rise into said pocket due to centrifugal force and be taken up by the roller means to stripe the wire as the roller means is rotated by the moving wire, said support means when in the releasing position thereof enabling the well to be removed for replenishment of ink therein.

3. In a wire striping machine, a unit rotatable on the machine about a vertical axis, driving means to rotate the unit, feed means to move a wire along the axis, means on the unit providing an inking pocket spaced from and opening toward the axis, a striping disk mounted on the unit for rotation relative thereto extending into said pocket to be inked and having peripheral rolling engagement with the wire and rotated by the latter due to movement thereof along the axis, the unit when rotating revolving the disk about said axis, a replaceable ink well separate from the unit below the pocket and having an open upper end to communicate with the pocket, and support means under the well capable of assuming high and low positions on the unit and when in high position cooperating with the unit to hold the well fixed to the unit with the upper end of the well in communication with the pocket to enable ink in the well to rise into the pocket due to centrifugal force as the unit rotates to be taken up by the disk to stripe the wire as the disk is rotated by the moving wire, said support when in low position releasing the well to permit removal thereof from the unit for replenishment of ink therein.

4. In a striping machine, a unit including a hollow shaft rotatable about a vertical axis, feed means moving a wire to be striped along the axis of the unit, means on the unit above the shaft providing an inking pocket spaced from and opening toward said axis, a striping roller rotatably mounted on the unit for rotation with respect thereto having rolling engagement with the wire and extending into the pocket to be inked, the roller being revolved around the axis when the unit rotates and being turned by the wire due to movement of the latter along said axis, a replaceable ink well separate from the unit below said pocket and extending along said shaft, a support for the well movable vertically along the shaft, positioning means on the shaft below the support movable along the latter to occupy high and low positions fixed with respect to the shaft and effective when in high position to cause the support in cooperation with the unit to hold the well fixed with respect to the unit and in communication with the pocket, and driving means to rotate the unit and cause ink in the well to rise into the pocket due to centrifugal force to be taken up by the roller to stripe the wire as the roller is rotated by the moving wire, said positioning means when in low position enabling the support to move down on the shaft and permit removal of the well.

5. In a striping machine, a unit including a hollow shaft rotatable about a vertical axis, feed means moving a wire to be striped along the axis of the unit, means on the unit above the shaft providing an inking pocket spaced from and opening toward said axis, a striping roller rotatably mounted on the unit for rotation with respect thereto having rolling engagement with the wire and extending into the pocket to be inked, the roller being revolved around the axis when the unit rotates and being turned by the wire due to movement of the latter along said axis, a replaceable ink well separate from the unit below said pocket and extending along said shaft, a support for the well movable vertically along the shaft, the latter having screw threads thereon, positioning means screw threaded on said threads of the shaft effective when run up on the shaft to cause the support in cooperation with the unit to hold the well fixed to the unit and in communication with the pocket, and driving means to rotate the unit and cause ink in the well to rise due to centrifugal force into the pocket to be taken up by the roller to stripe the wire as the roller is rotated by the moving wire, said positioning means when run down on said shaft enabling the support to descend for removal of the well.

6. In an electric conductor striping machine, a unit rotatable on the machine about a vertical axis, driving means to rotate the unit, feed means to move an electric conductor along said axis, means fixed to the unit spaced from said axis defining an inking pocket the lower end of which is open, a striping disk mounted on the unit for rotation relative thereto and revolution thereby around said axis when the driving means rotates said unit, said disk being rotated due to peripheral engagement with the conductor when the latter is moved by said feed means and said disk extending into said pocket to be inked, an ink well below said pocket formed separately from said unit and having an open upper end, guide means on the unit to receive the upper open end of said well and register the same with said lower open end of the pocket, and support means capable of assuming a high supporting position on the unit and a low releasing position and effective when in high position to hold the well fixed to the unit with the upper end of the well up in said guide means and communicating with the pocket to enable ink in the well during rotation of the unit to rise into said pocket due to centrifugal force to be taken up by the disk to stripe the conductor as the disk is rotated by the moving wire, said support means when in low position releasing the well and enabling the latter to move down out of said guide means for removal from the unit for renewal of ink therein.

7. In a striping machine, a mechanism vertically moving a wire to be striped through the machine, a striping unit having means providing an inking pocket radiating from the wire, driving means rotating the unit around the wire, a striping disk rotatably mounted on the unit extending into the pocket and revolved about the wire by the unit and having rolling engagement with the wire and turned by the latter due to vertical movement of the wire, the unit being formed with a downwardly opening socket below and communicating with the pocket, a support on the unit formed with an upwardly opening socket below the first socket, a replaceable ink well formed to fit said sockets and open at the upper end thereof, and holding means for the support vertically adjustable to two positions on the unit and effective in one position to cause the support in cooperation with the unit to hold the well in said sockets fixed to the unit so that during rotation of the unit ink in the well will rise into said pocket due to centrifugal force to be taken up by the disk to stripe the wire as the disk is rotated by the moving wire, and said holding means in another position holding the support in a position permitting the well to be removed from said sockets.

8. In a striping machine, a mechanism vertically moving a wire to be striped through the machine, a striping unit having means providing an inking pocket radiating from the wire, driving means rotating the unit around the wire, a striping disk rotatably mounted on the unit extending into the pocket and revolved about the wire by the unit and having rolling engagement with the wire and turned by the latter due to vertical movement of the wire, an ink well having an open upper end of given cross sectional area and having a lower part of greater cross sectional area and having a greater dimension measured around said axis than the dimension thereof measured radially of said axis, and a support for the well adjustable vertically on the unit to assume high and low positions and formed to fit said lower part of the well and effective in high position to cooperate with the unit to hold the well fixed to the unit with said open upper end in communication with said pocket to enable ink in the well to rise into said pocket due to centrifugal force as the unit rotates to be taken up by the disk to stripe the wire as the disk is rotated by the moving wire, said support when in low position permitting removal of the well from said unit.

9. In a striping unit for a striping machine, a head having an axis of rotation, an upright carrier pivotally mounted on the head for angular movement toward and from said axis, an inking roller rotatably mounted on the carrier, a stop limiting movement of the carrier toward said axis, and resilient means normally holding the carrier against said stop but yieldable to permit movement of the carrier and roller away from said axis.

10. In a striping unit for a striping machine, a head having an axis of rotation, a carrier pivoted on the head for angular movement toward and from said axis, a bearing on the carrier the axis of which passes through the axis of the head, a holder adjustable angularly in said bearing about the axis of the latter, a striping roller rotatably mounted on the holder about an axis perpendicular to the axis of the bearing, adjustable stop means limiting movement of the carrier and roller toward the axis of the head, and resilient means holding the carrier against the stop but yieldable to permit movement of the carrier and roller away from the axis of the head.

11. In a wire striping machine, a hollow shaft rotatable about a vertical axis, a horizontal plate fixed with respect to the shaft, a hood secured to the plate extending upwardly therefrom and formed with an inking pocket therein opening toward the axis above said plate, an ink well fixed with respect to the shaft below the plate and communicating with the pocket, means to move a wire along said axis, driving means to rotate the shaft, and a striping roller above said plate extending into said pocket and mounted on the plate for rotation relative thereto and revolution thereby around said axis when the shaft rotates, the roller being in rolling engagement with the wire and rotated thereby as the wire moves along the axis, ink in the well rising into the pocket and being held in the latter spaced from the wire due to centrifugal force when the shaft rotates and being taken up by the roller to stripe the wire as the roller is rotated by the moving wire.

12. The wire striping machine set forth in claim 11 wherein a cover on the plate incloses the hood and roller to reduce evaporation of ink and has a hole therein for passage of the wire.

13. The wire striping machine set forth in claim 11 wherein a cover on the plate incloses the hood and roller to reduce evaporation of ink and is made of two parts one of which is secured to the plate and the other part of which is mounted to move from the normal position thereof to open position to afford access to the hood and roller for purposes of cleaning.

14. In a striping machine, feed means vertically moving a wire to be striped through the machine, a striping unit rotatable about the wire and having an inking pocket therein radiating from the wire, a replaceable ink well, lock means normally cooperating with the unit holding the well on the unit below and in communication with the pocket, means rotating the unit and well around the wire to cause ink in the well to rise into the pocket and be held therein spaced from the wire by centrifugal force due to rotation of the unit, and a striping roller rotatably mounted on the unit extending into the pocket and revolved about the wire by the unit and having rolling engagement with the wire and rotated thereby due to movement of the wire to take up ink from the pocket to stripe the wire.

15. In a striping machine, a unit mounted for rotation about a vertical axis and provided with a plurality of inking pockets arranged around said axis, driving means to rotate the unit, feed means to move a wire along the axis, a striping roller for each pocket rotatably mounted on the unit extending into the corresponding pocket and revolved about the axis by the unit and having rolling engagement with and rotated by the wire due to motion of the latter along said axis, a vertically extending ink well below each pocket, a support on the unit common to the wells, means to exert an upward force on the support and cause the latter to cooperate with the unit to hold the wells fixed to the unit, and a resilient means intermediate each well and the support, said resilient means transmitting said force and yielding in amounts to compensate for slight variations in the lengths of the wells, ink in each well rising into the corresponding pocket due to centrifugal force as the unit rotates to be taken up by the associated roller to stripe the wire as the roller is rotated by the moving wire.

16. In a striping machine, mechanism vertically moving a wire to be striped through the machine, a striping unit having means thereon providing an inking pocket having an opening therein spaced from and facing toward the wire, driving means rotating the unit around the wire, a striping disk rotatably mounted on the unit extending through said opening into the pocket and revolved about the wire by the unit and extending from said opening to the wire and having rolling engagement with the wire and turned by the latter due to vertical movement of the wire, a replaceable ink well located below said pocket and disk having an opening in the upper end thereof communicating with said pocket, and releasable means on the unit detachably holding the well on the unit normally holding the well in position on the unit to enable ink in the well to rise from the well and pass through the opening in the well into said pocket due to centrifugal force when the driving means rotates the unit to be taken up by the disk to stripe the wire as the disk is rotated by the moving wire, said releasable means when released enabling the well to be detached from the unit to be moved out of the path of any liquid cleaning agent which may be applied to that part of the disk extending from the wire to the pocket and drip from the disk.

17. The striping machine set forth in claim 16 wherein a cover mounted on the striping unit has a part at least thereof movable relatively to the striping unit to expose the disk for cleaning purposes.

18. In a wire striping machine, a unit rotatable on the machine about a vertical axis, driving means to rotate the unit, feed means to move a wire along said axis, a hood mounted on the unit rotating therewith spaced from said axis and providing therein an inking pocket opening toward said axis, a striping roller mounted on the unit for rotation relative thereto extending into said pocket to be inked and extending from said hood to the wire and having peripheral rolling engagement with the wire and rotated by the latter due to movement thereof along said axis, the unit when rotating revolving the roller about said axis, an ink well on the unit below said pocket having an open upper end to communicate with the pocket, the driving means when rotating the unit causing ink in the well to rise into the pocket due to centrifugal force to be taken up by the roller to stripe the wire as the roller is rotated by the moving wire, and a cover on the unit through which the wire passes inclosing the hood and roller to reduce evaporation of the ink due to rotation of the unit.

19. In a striping unit for a striping machine, a head having an axis of rotation, a striping roller mounted on the head for rotation relative thereto, a replaceable hollow ink well separate from the head having an open upper end, releasable holding means on the head normally cooperating with the latter to hold the well fixed with respect to said head and axis but said holding means being movable relative to the head to release the well for removal from the head in a direction away from said axis, and means fixed with respect to the head when the well is fixed to the head defining an ink pocket into which the striping roller extends and communicating with the interior of said well through said open upper end of the well.

20. In a striping unit for a striping machine, a head having an axis of rotation, a striping roller mounted on the head for rotation relative thereto and extending away from a point closely adjacent to said axis, a combined ink well and hood unit separate from the head spaced from said axis comprising a part inclosing an ink chamber and a hood part having an ink pocket therein communicating with the ink chamber and provided with an opening for the roller, and releasable lock means normally in non-released position and cooperating with the head to hold the combined unit fixed with respect to the head with the opening in the pocket facing said axis and with said roller extending through said opening into said ink pocket, said releasable means when released enabling the combined unit to be moved away from said roller and the head.

21. The striping unit set forth in claim 20 wherein said lock means includes a strap around the head held by the latter against axial movement along the head when the lock means is in non-released position, and means on the combined unit engaging the strap to prevent movement of the unit relative to the head in a direction parallel to said axis.

22. The striping unit set forth in claim 20 wherein said head includes a hollow shaft concentric with said axis provided with vanes which radiate from said axis, and said combined unit has sides held in engagement with said vanes by said lock means when the latter is in non-released position.

23. The striping unit set forth in claim 20 wherein said head includes a hollow shaft concentric with said axis and vanes which radiate from said axis and a plate between said vanes, and said combined unit has a bottom which rests on said plate to be supported by the latter when said lock means is released.

24. The striping unit set forth in claim 20 wherein said head includes a hollow shaft concentric with said axis provided with vanes which radiate from said axis and have thereon bosses spaced in a direction parallel to said axis and the combined unit has ribs aligned with the bosses, and the lock means comprises a strap which extends between said bosses and ribs when the lock means is in non-released position.

25. In a combined ink well and hood unit for a striping machine provided with a striping roller and a head supporting the roller, said combined unit comprising an ink well formed with an interior ink chamber and a hood fixed to the well and inclosing an ink pocket communicating with the chamber, and the hood having an opening therein through which the roller can extend to enter the ink pocket.

26. In a combined ink well and hood unit for a striping machine provided with a striping roller and a head supporting the roller, said combined unit comprising an ink well formed with an interior ink chamber and a hood fixed to the well inclosing an ink pocket and formed with an opening to receive the roller and means on the unit constituting a breakable seal between the chamber and pocket normally preventing communication between said chamber and pocket but when broken effecting communication between the pocket and chamber to enable ink in the latter to flow into the pocket.

27. The combined ink well and hood unit set forth in claim 26 wherein said means constituting a breakable seal comprises a part of the well extending between the chamber and pocket providing a connecting opening for establishing communication between the chamber and the pocket, and a cork normally closing said connecting opening to prevent flow of ink from the chamber to the pocket but removable from the connecting opening to enable ink to flow from said chamber into said pocket.

28. The combined ink well and hood unit set forth in claim 26 wherein said means constituting a breakable seal is an imperforate part of the well extending between the chamber and pocket normally effective to prevent communication between the chamber and pocket but formed with a weakened breakable zone which when broken permits ink to flow from the chamber into the pocket.

(Other references on following page)

References Cited in the file of this patent

UNITED STATES PATENTS

| Number | Name | Date |
|---|---|---|
| 2,126,810 | Pugh | Aug. 16, 1938 |
| 2,344,610 | Hargreaves et al. | Mar. 21, 1944 |
| 2,370,314 | Jenner | Feb. 27, 1945 |
| 2,441,327 | Norris | May 11, 1948 |
| 2,537,884 | Forsberg | Jan. 9, 1951 |
| 2,581,180 | Entewistle et al. | Jan. 1, 1952 |
| 2,610,607 | Isenberg | Sept. 16, 1952 |

FOREIGN PATENTS

| Number | Country | Date |
|---|---|---|
| 681,748 | Germany | Sept. 30, 1939 |